United States Patent [19]

Kleeberg et al.

[11] Patent Number: 4,578,452

[45] Date of Patent: Mar. 25, 1986

[54] METHOD FOR MANUFACTURING EPOXY RESIN MOLDED MATERIALS

[75] Inventors: Wolfgang Kleeberg, Erlangen; Klaus-Robert Hauschildt; Heinz Hacker, both of Nuremberg; Klaus Kretzschmar, Erlangen, all of Fed. Rep. of Germany

[73] Assignee: Siemens Aktiengesellschaft, Munich, Fed. Rep. of Germany

[21] Appl. No.: 633,005

[22] Filed: Jul. 20, 1984

[30] Foreign Application Priority Data

Jul. 22, 1983 [DE] Fed. Rep. of Germany ....... 3326532

[51] Int. Cl.$^4$ ...................... C08G 59/24; C08G 59/42
[52] U.S. Cl. ..................................... 528/297; 528/361
[58] Field of Search ................................. 528/361, 297

[56] References Cited

U.S. PATENT DOCUMENTS

| | | | |
|---|---|---|---|
| 3,764,584 | 10/1973 | Hope et al. | 528/361 X |
| 3,989,679 | 11/1976 | Sluis et al. | 528/361 |
| 4,294,746 | 10/1981 | Blair et al. | 528/361 X |
| 4,336,367 | 6/1982 | Morris et al. | 528/361 X |
| 4,412,047 | 10/1983 | Monnier et al. | 528/361 X |

*Primary Examiner*—Earl Nielsen
*Attorney, Agent, or Firm*—Kenyon & Kenyon

[57] ABSTRACT

This application relates to methods for the manufacture of leakage current-proof epoxy-resin molded materials from epoxy resin mixture based on di- or polycarboxylic-acid glycidyl esters, di- or polyfunctional cycloaliphatic olefinic epoxides and dicarboxylic-acid anhydrides, carried out in such a manner that molded materials with good mechanical properties are obtained also for parts of large volume. For this purpose, the invention provides that, by means of the experimentally determined time necessary to reach the maximum temperature during the cross-linking of the epoxy resin mixture under quasi adiabatic conditions, the rate of cross-linking of the epoxy resin mixture is adjusted, by the addition of a diol or polyol, to at least as long as the time necessary to reach the maximum temperature during cross-linking of the glycidyl ester/dicarboxylic acid anhydride components.

14 Claims, No Drawings

METHOD FOR MANUFACTURING EPOXY RESIN MOLDED MATERIALS

BACKGROUND OF THE INVENTION

This invention relates to a method for manufacturing leakage current-proof epoxy resin molded materials from epoxy resin mixture based on di- or polycarboxylic acid glycidyl esters, di- or polyfunctional cycloaliphatic olefinic epoxides, dicarboxylic acid anhydrides and reaction accelerators as well as, optionally, fillers and other additives.

Energy-related apparatus and installations, frequently require electrical insulating components of large volume, and having large differences in wall thickness within the individual part. The insulating material employed for that purpose is generally based on reaction resin molded materials and in particular, upon epoxy resin molded materials which usually also contain fillers. If stringent requirements exist with respect to mechanical strength, a model for such properties is represented by a standard molded material based on Araldit ®B (molded material 1,000-6).

Future technical developments in the field of energy-related apparatus and installation are aimed, among other things, toward obtaining higher power per unit volume. This, however, increases the requirements with respect to the mechanical-thermal "stressability" of the insulating components. An additional requirement, for instance, for switching installations, is a high leakage current resistance corresponding to Step KA 3c or KB 600 (DIN 53 480). Moreover, open-air resistance is also required. In addition, modern production methods require economical manufacturing methods, for instance, injection molding methods.

In recent times it has been found that the selection of epoxy resins for use in the manufacture of molded materials of the above-mentioned type, must take into account the toxicological aspects of the epoxy resin selected in order to minimize potential toxicological dangers during processing. This requirement has lead to a reduction in the epoxy resin compounds available for technical use and thereby, to a drastic limitation on the synthesis of reaction resin polymer lattices, and particularly on such reaction resin polymer lattices which could be used to provide molded materials having the properties discussed-above.

The foregoing also applies to injection-moldable filler-containing epoxy resin systems available for a number of years, which are based on 1,3-bisglycidyl-5,5-dimethyl hydantoin/1-glycidyl-3-beta-glycidyl oxypropyl-5,5-dimethylhydantoin/1-glycidyl-3-beta-hydroxypropyl-5,5-dimethylhydantoin with the isomer mixture of methyltetrahydrophthalic-acid anhydride. With this system, for instance, insulating materials and parts, suitable for use in medium-voltage switching installations, can be manufactured which meet the requirements raised above. It has been found, however, that the chemical basis of these systems must be replaced for toxicological reasons.

Therefore, the problem which arose was to find an injection-moldable resin system based on epoxy resins which would be available for the long term, and which are toxicologically unobjectionable, which is at least equivalent in electrical and mechanical-thermal respects when compared to the hydantoin system mentioned above.

It is known from the technology of epoxy resins that resins of different structure (E1, E2 ...) and polyaddition components such as dicarboxylic acid anhydrides of different structure (S1, S2 ...) can be combined in order to form reaction resin lattices, while observing stoichiometric boundary conditions, as to type and weight content, which are variable within wide limits. The properties of the molded materials expected from combination systems (E1, E2 ... and S1, S2 ...) can often be estimated from the molded material properties of the boundary systems (such as E1/S1, E2/S2, E1/S2, E2/S1) and the weight contents employed, while observing stoichiometric boundary conditions and adequate reaction conditions. However, the knowledge regarding the structure and properties of epoxy resin lattices is not sufficient for quantitative estimates, so that empirical optimizing work must be conducted.

The problem confronted consisted in finding a replacement of the above-mentioned hydantoin system which has the following properties:

| | | |
|---|---|---|
| bending strength (BF) | 128 N/mm$^2$ | (DIN 53 452) |
| impact strength (SZ) | 12 kJ/m$^2$ | (DIN 53 453) |
| dimensional heat resistance after Martens ($T_M$) | 126° C. | (DIN 53 458) |
| leakage current resistance (KB method | greater than 600 | (DIN 53 480) |

DETAILED DESCRIPTION OF THE INVENTION

To obtain the required properties, epoxy resin systems based on di- or polycarboxylic acid glycidyl esters, di- or polyfunctional cycloaliphatic olefinic epoxides and dicarboxylic-acid anhydrides were selected. It was found that, while good results can be achieved with such systems in the preparation of standard rods, (i.e., parts of low volume), molded materials with insufficient mechanical strength are obtained if parts of larger volume are made.

It is an object of this invention to carry out the manufacture of epoxy resin molded materials from epoxy resin mixture based on di- or polycarboxylic acid glycidyl esters, di- or polyfunctional cycloaliphatic olefinic epoxides and dicarboxylic acid anhydrides in such a manner that good mechanical properties are obtained not only for parts of small volume, but also for parts of large volume.

In the above system, the synergistic increase in the cross-linking rate of the epoxy resin mixture due to the ratio of the glycidyl ester to cycloaliphatic olefinic epoxide employed, is experimentally determined. In accordance with this invention a diol or polyol is added to the foregoing in an amount necessary to lower the cross-linking rate of the epoxy resin mixture to at least the cross-linking rate of the glycidyl ester/dicarboxylic acid anhydride system. The cross-linking rate of the glycidyl ester/dicarboxylic acid anhydride system is determined in terms of the time necessary to reach the maximum temperature observed during cross-linking of that system under quasi-adiabatic conditions. Through the addition of the appropriate and experimentally determined amount of a diol or polyol, the cross-linking rate of the epoxy resin mixture under quasi-adiabatic conditions, is lowered to at least the above-described rate of cross-linking of the glycidyl ester/dicarboxylic acid anhydride system.

Upon close examination of the system of glycidyl ester/cycloaliphatic olefin epoxide/dicarboxylic acid anhydride, a synergistic acceleration, i.e., an increase of the cross-linking rate was surprisingly found. This synergistic acceleration can be utilized for the production of small-volume cast-resin parts (about 0.1 to 100 ml) in a technically advantageous manner. However, in the case of casting resin parts of larger volume, for example, in molded parts with a volume of about 10 liters, the formation of the lattice structure from the reaction-resin system proceeds at different rates within the casting resin part, especially in molded parts having large wall thickness differences (for instance, between 1 and 40 mm), and therefore, a differing rate of rapid removal of reaction heat into the injection mold. As a result of the foregoing, zones of low mechanical strength are generated in the process which can be recognized, for example, as cracks in the injection-molded part after removal from the mold.

According to this invention, the synergistic acceleration of the cross-linking rate of the above-mentioned epoxy resin system, which depends on the ratio of glycidyl ester to cycloaliphatic olefin epoxide is determined, and the cross-linking rate of the epoxy resin mixture controlled, while maintaining stoichiometry. This is accomplished by the addition of a diol or polyol in such a manner that cross-linking takes at least the same time as the system of the individual components which is cross-linked at the most rapid rate. In the present case this is the system glycidyl ester/dicarboxylic acid anhydride, while the system cycloaliphatic olefin epoxide/dicarboxylic acid anhydride is cross-linked more slowly. The required amount of diol and/or polyol to accomplish the foregoing is determined empirically.

The weight ratio between the glycidyl ester and the cycloaliphatic olefin epoxide is advantageously between 9:1 and 1:9 in the method according to the invention, and is preferably 1:1. The glycidyl ester preferably used in this method is hexahydrophthalic-acid bisglycidyl ester, and as the cycloaliphatic definic epoxide, 3,4-epoxy-cyclohexylmethyl-3',4'-epoxy cyclohexane carboxylate. Cross-linking agents, i.e., hardeners, are advantageously derivatives of phthalic-acid anhydride, particularly methyltetrahydrophthalic-acid anhydride, hexahydrophthalic-acid anhydride and endomethylenetetrahydrophthalic-acid anhydride.

In the method of this invention, polyetherpolyols, especially polyetherglycols are advantageously added to the epoxy resin compound as the diol or polyol component. Preferably, polyether polyols with a mean molecular weight of about 400 are used here. Diols or polyols also suitable for use include, for example, neopentylglycol, 1,6-hexanediol, 1,4-butane diol, trifunctional compounds such as glycerol and castor oil as well as mixtures of the mentioned compounds.

Epoxy resin molded materials produced in accordance with the method of the invention can be used advantageously for insulating parts such as supports, suspension insulators and bushings in open-air installations.

The invention will now be explained in greater detail, with reference to the following examples:

EXAMPLES

The following systems were employed:

Hexahydrophthalic-acid bisglycidylester (E1)/methyltetrahydrophthalic-acid anhydride (S1) and 3,4-epoxy cyclohexylmethyl-3',4'-epoxy cyclohexanecarboxylate (E2)/methyltetrahydrophthalic-acid anhydride (S1); both systems contained $SiO_2$ as a filler. The system E1/S1 by itself yields a molded material with low thermal strength and high mechanical strength; the system E2/S1 yields a molded material with high thermal strength and low mechanical strength.

From the two individual systems, the following combination system E1/S1-E2/S1 was prepared (MT=weight parts): 50 MT E1; 50 MT E2/110 MT S1/400 MT $SiO_2$/3 MT MeI (accelerator based on 1-methylimidazole). The property pattern (in the form of bending strength (BF), impact strength (SZ), Martens temperature ($T_M$) and leakage current resistance) of injection molded standard rods of the two individual systems and of the combination system is given in Table 1.

TABLE 1

| E1/S1:E2/S1 | BF [N/mm$^2$] | SZ [kJ/m$^2$] | $T_M$ [°C.] | Leakage Current Resistance | |
|---|---|---|---|---|---|
| | | | | KA-Method | KB-Method |
| 1:0 | 134 | 9 | 111 | 3c | <600 |
| 0.5:0.5 | 122 | 10 | 140 | 3c | <600 |
| 0:1 | 111 | 6 | 189 | 3c | <600 |

TABLE 2

| E1/S1:E2/S1 | max [°C.] | max [min] |
|---|---|---|
| 1:0 | 200 | 16 |
| 0.5:0.5 | 198 | 12 |
| 0:1 | 190 | 21 |

As can be seen from Table 1, the molded material of the combination system exhibits good mechanical and thermal stability. The transfer of the properties achieved with the standard rods to parts with a volume of about 10 liters and wall thicknesses between 3 and 32 mm, however, yielded a negative result in the form of injection-molded parts with insufficient mechanical strength. Closer examination showed, as already explained, that a synergistic acceleration occurs in the combination system E1/S1-E2/S1. This situation can be seen from the data presented in Table 2 set forth above, in which the temperature rise is given in the cross-linking of the various resin systems in the form of the maximum temperature $v_{max}$ (during the cross-linking) and the time $t_{max}$ until the maximum temperature is reached.

The value for $t_{max}$ of 12 minutes for the combination system shows a considerable synergistic acceleration as compared to the two individual systems (E1/S1: 16 minutes; E2/S1: 21 minutes). The same is true for other combination systems, for instance, the system E1/S1-E2/S2, where S2=hexahydrophthalic acid anhydride.

The determination of $v_{max}$ and $t_{max}$ is generally carried out in accordance with DIN 16 945. An epoxy resin mixture with a volume of about 250 ml is cross-linked under quasi adiabatic conditions and the temperature rise is determined. In the same manner, the amount of diol or polyol which must be added to the epoxy resin mixture is determined. By analogy to injection molding, for manufacturing an insulating part, for example, a 20-kV bushing for $SF_6$ medium-voltage switching installations according to the method of the invention, a casting resin mixture with the following composition is prepared:

50 MT hexahydrophthalic-acid bisglycidyl ester, 50 MT 3,4-epoxy cyclohexylmethyl-3',4'-epoxy-cyclohexanecarboxylate, 110 MT methyltetrahydrophthalic-acid anhydride (isomer mixture), 3 MT accelerator (with 1-methylimidazole as the effective component), 20 MT polypropyleneglycol (mean molecular weight: about 400) and 400 MT quartz meal (6400 mesh/cm$^2$; 16 hours at 150° C. predried). These components are placed, in the order mentioned, into a suitable stirring device, and are homogenized and degassed at room temperature for 1 hour in a vacuum (less than 5 mbar) while stirring.

The casting resin mixture obtained in the manner described above is processed by the technically customary low-pressure injection molding method (RIM method)(shot weight: 12 kg) where the following process parameters apply:

Mold temperature: 16° C.; mold filling time: 1 minute; mold occupancy time: 18 minutes; pressure: 5 bar.

After removal from the mold, the part is further cross-linked (outside the mold) for another 16 hours at 150° C.

The part manufactured by the method according to the invention has the following property values: BF: 121 N/mm$^2$; SZ: 12.5 kJ/m$^2$; T$_M$: 123° C. This part shows no T$_E$ set-in voltage up to 50 kV. In contrast thereto, corresponding parts which were not manufactured by the method according to the invention, i.e., without the addition of polypropyleneglycol, have a T$_E$ set-in voltage of less than 5 kV; such bushings, however, are not useful for medium voltage switching installations.

While certain representative embodiments of the present invention have been set forth for the purpose of illustrating the invention, it will be apparent to those of ordinary skill in the art that various changes and modifications may be made therein without departing from the spirit and scope of the invention.

What is claimed is:

1. A method for the preparation of a leakage current-proof epoxy resin molded material comprising the steps of:
   combining a di- or polycarboxylic acid glycidyl ester, 3,4-epoxycyclohexylmethyl-3',4'-epoxycyclohexane carboxylate, a dicarboxylic acid anhydride, and a reaction accelerator to form an epoxy resin molding material, wherein due to the ratio of glycidyl ester cycloaliphatic olefin epoxide present in said olefinic combination there is a synergistic increase in the rate of cross-linking of the epoxy resin composition relative to the rate at which said cycloaliphatic olefinic epoxide cross-links in the absence of said glycidyl ester; and adding to said composition an amount of a diol or polyol effective to lower the rate of cross-linking of the epoxy resin composition such that the time necessary to reach a maximum temperature during the cross-linking of the epoxy resin composition will be at least as long as the time necessary to reach the maximum temperature during the cross-linking of said glycidyl ester dicarboxylic acid anhydride components of said composition under quasi-adiabatic conditions, and placing said composition in a suitable mold and then heating said composition.

2. The method according to claim 1 wherein the weight ratio of glycidyl ester to olefinic epoxide is from about 9:1 to about 1:9.

3. The method according to claim 2 wherein said ratio is about 1:1, and said combination further includes fillers.

4. The method according to claim 1 wherein said polyol is a polyether polyol or a polyether glycol.

5. The method according to claim 3, wherein said polyol is a polyether polyol or a polyether glycol.

6. The method according to claim 4 wherein said polyol has a mean molecular weight of about 400.

7. The method according to claim 1 wherein the cross-linking agent is a phthalic acid anhydride derivative selected from the group consisting of methyltetrahydrophthalic acid anhydride, hexahydrophthalic acid anhydride, and endomethylenetetrahydrophthalic acid anhydride.

8. The method according to claim 2 wherein the cross-linking agent is a phthalic acid anhydride derivative selected from the group consisting of methyltetrahydrophthalic acid anhydride, hexahydrophthalic acid anhydride, and endomethylenetetrahydrophthalic acid anhydride.

9. The method according to claim 3 wherein the cross-linking agent is a phthalic acid anhydride derivative selected from the group consisting of methyltetrahydrophthalic acid anhydride, hexahydrophthalic acid anhydride, and endomethylenetetrahydrophthalic acid anhydride.

10. The method according to claim 9 wherein said polyol is a polyether polyol or a polyether glycol having a mean molecular weight of about 400.

11. A method for preparing insulating parts suitable for open air applications comprising the steps of:
   A. combining a di- or polycarboxylic glycidyl ester, 3,4 epoxycyclohexylmethyl-3',4'-epoxycyclohexanecarboxylate, a dicarboxylic acid anhydride, and a reaction accelerator, to form an epoxy resin compound in a ratio wherein there is a synergistic increase in the rate of cross-linking of the epoxy resin compound and
   B. adding to said combination an amount of a diol or polyol effective to lower the rate of cross-linking of said epoxy resin compound such that the time necessary to reach the maximum temperature during cross-linking of the epoxy resin compound quasi-adiabatic conditions will be at least as long as the time necessary to reach the maximum temperature during cross-linking of said glycidyl ester dicarboxylic acid anhydride components of said combination under quasi-adiabatic conditions; and then
   C. placing said composition in a suitable mold
   D. heating said composition.

12. The method according to claim 11 wherein the weight ratio of the glycidyl ester to olefinic epoxide is from about 9:1 to about 1:9.

13. The method according to claim 12 wherein said ratio is about 1:1, and said combination further includes a filler.

14. The method according to claim 11 wherein said glycidyl ester is hexahydrophthalic acid bisglycidyl ester, said polyol is selected from the group consisting of polyether polyols and polyether glycols; and said dicarboxylic acid anhydride is selected from the group consisting of methyltetrahydrophthalic acid anhydride, hexahydrophthalic acid anhydride, and endomethylenetetrahydrophthalic acid anhydride.

* * * * *

UNITED STATES PATENT AND TRADEMARK OFFICE
CERTIFICATE OF CORRECTION

PATENT NO. : 4,578,452

DATED : July 20, 1986

INVENTOR(S) : Kleeberg et al.

It is certified that error appears in the above-identified patent and that said Letters Patent is hereby corrected as shown below:

At Column 1, line 8, change "mixture" to --mixtures--.

At Column 2, line 44, change "mixture" to --mixtures--.

At Column 3, lines 23, 31 and 36, change "olefin" to --olefinic-- in each instance.

At Column 5, line 16, change "16" to --165--.

At Column 5, line 47, after "ester", insert --to--.

At Column 5, line 47, after "in", insert --the--.

At Column 5, line 48, change "said olefinic combination" to --composition--.

UNITED STATES PATENT AND TRADEMARK OFFICE
CERTIFICATE OF CORRECTION

PATENT NO. : 4,578,452

DATED : July 20, 1986

INVENTOR(S) : Kleeberg et al.

It is certified that error appears in the above-identified patent and that said Letters Patent is hereby corrected as shown below:

At Column 5, line 58, after "composition", insert --under quasi-adiabatic conditions--.

At Column 5, line 61, after "ester", insert --/--.

At Column 5, line 66, before "olefinic", insert --cycloaliphatic--.

At Column 6, line 54, before "olefinic", insert --cycloaliphatic--.

At Column 6, lines 36 and 37, change "compound" to --composition--.

At Column 6, line 39, change "compound" to --composition--.

UNITED STATES PATENT AND TRADEMARK OFFICE
CERTIFICATE OF CORRECTION

PATENT NO. : 4,578,452

DATED : July 20, 1986

INVENTOR(S) : Kleeberg et al.

It is certified that error appears in the above-identified patent and that said Letters Patent is hereby corrected as shown below:

At Column 6, line 44, change "compound" to --composition under--.

Signed and Sealed this

Sixteenth Day of September 1986

[SEAL]

Attest:

DONALD J. QUIGG

Attesting Officer

Commissioner of Patents and Trademarks